United States Patent

Schwarz

[11] Patent Number: 5,743,692
[45] Date of Patent: Apr. 28, 1998

[54] CAPTIVE BOLT ASSEMBLY

[76] Inventor: Hans U. Schwarz, 216 Avenue A, Snohomish, Wash. 98290

[21] Appl. No.: 800,815

[22] Filed: Feb. 18, 1997

[51] Int. Cl.$^6$ .............................. F16B 21/18; F16B 31/00
[52] U.S. Cl. .............................. 411/353; 411/107; 411/999
[58] Field of Search .............................. 411/107, 111, 411/112, 113, 352, 353, 999

[56] References Cited

U.S. PATENT DOCUMENTS 2,967,557  1/1961  Tait et al. .............................. 411/999 X
5,462,395  10/1995  Damm et al. .............................. 411/353 X

FOREIGN PATENT DOCUMENTS 125200  4/1919  United Kingdom .............................. 411/107

Primary Examiner—Neill R. Wilson

[57] ABSTRACT

A self contained captive bolt assembly which is riveted onto a plate for purposes of mounting the plate onto structure. The assembly forms a high strength joint with the use of common close tolerance holes through the plates being joined and is designed to mate with a common plate nut. A receptacle houses the assembly and traps the bolt between the bolt head and a retainer attached to the bolt. The captive bolt is provided with a spring between the retainer and an end cap which acts to hold the bolt in a retracted position prior to fastening.

20 Claims, 7 Drawing Sheets

CAPTIVE BOLT ASSEMBLY

BACKGROUND—FIELD OF INVENTION

The present invention generally relates to threaded fasteners and in particular, to captive bolt assemblies used to mount solid panels.

BACKGROUND—DESCRIPTION OF PRIOR ART

The majority of existing captive screw designs cannot be used in high strength applications. By their nature, either the joint has threads in bearing, or the load bearing shank of the screw has been necked down to facilitate retention. Other screw assemblies rely on oversized holes, counter boring, countersinking, etc. for retention and thus cannot be used with the close tolerance structural holes needed for transferring high and cycling loads.

Existing captive screws which are suitable for high strength joints have one or more of the following shortcomings:

a) The screw cannot be used with conventional nuts and plate nuts.

b) The screw assembly is of a complex nature and consists of many parts which adds to costs and lowers reliability.

c) The screw form is highly specialized and thus expensive to manufacture.

d) The means of screw retention is not considered positive and thus cannot be used in aircraft engine inlets.

e) The screw is not self-ejecting. Spring loading the screw in the retracted position eases panel installation and precludes scratching or damaging the underlying panel or the underlying panel holes.

OBJECTS AND ADVANTAGES

Accordingly, several objects and advantages of my invention are:

a) to provide a captive bolt for high strength joints;

b) to provide a self-ejecting captive bolt for high strength joints;

c) to provide a captive bolt assembly of simple construction, and reliable operation;

d) to provide a captive bolt assembly with positive bolt retention suitable for use in aircraft engine inlet areas;

e) the shear pin is a common, conventional bolt;

f) the captive bolt can be used with common, conventional close tolerance structural holes;

g) the captive bolt can be used with common, conventional nuts and plate nuts; and h) the ejection spring is protected from hostile environments when the bolt is fastened.

Further objects and advantages of my invention will become apparent from a consideration of the drawings and ensuing description.

DRAWING FIGURES

FIG. 1 shows a cross sectional view of a first embodiment of a captive bolt constructed in accordance with this invention. The captive bolt assembly is shown installed onto a panel and the joint is fully mated and clamped.

FIG. 2 shows the preferred embodiment of this invention. A coil spring and an end cap have been added to the device of FIG. 1. The captive bolt assembly is shown installed onto a panel prior to panel installation.

SUMMARY

In accordance with the present invention a captive bolt assembly, comprising a bolt, a retainer and a receptacle, used to form a high strength joint. An added coil spring with an end cap or plate maintains the bolt in a retracted position prior to fastening.

DETAILED DESCRIPTION—FIGS. 1–8

Figure 1:
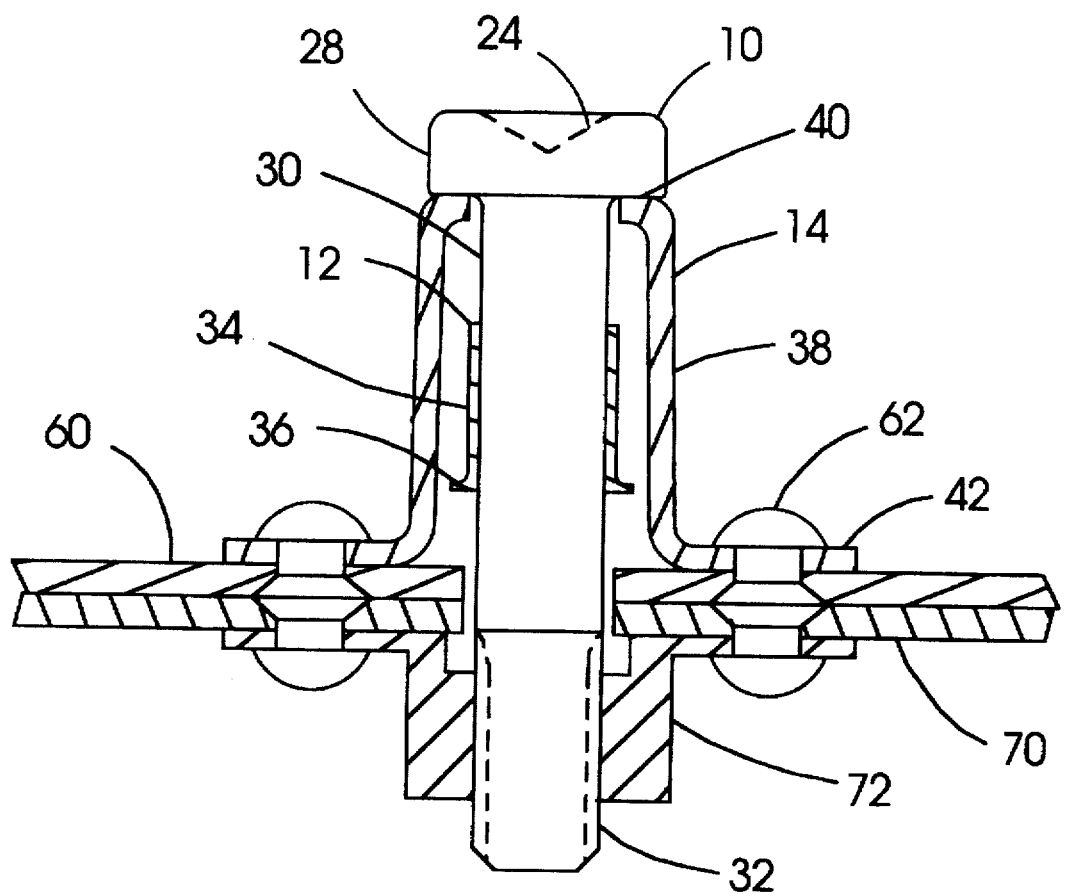

FIG. 1 illustrates a typical embodiment of the captive bolt assembly of the present invention. The joint is shown mated and clamped.

A bolt 10 comprises a head 28, a smooth shank portion 30, and a threaded portion 32. Smooth shank portion 30 of bolt 10 extends through a panel 60 and a structural member 70. Threaded portion 32 of bolt 10 is gripped by a common plate nut 72 which is attached to structural member 70.

Figure 5:
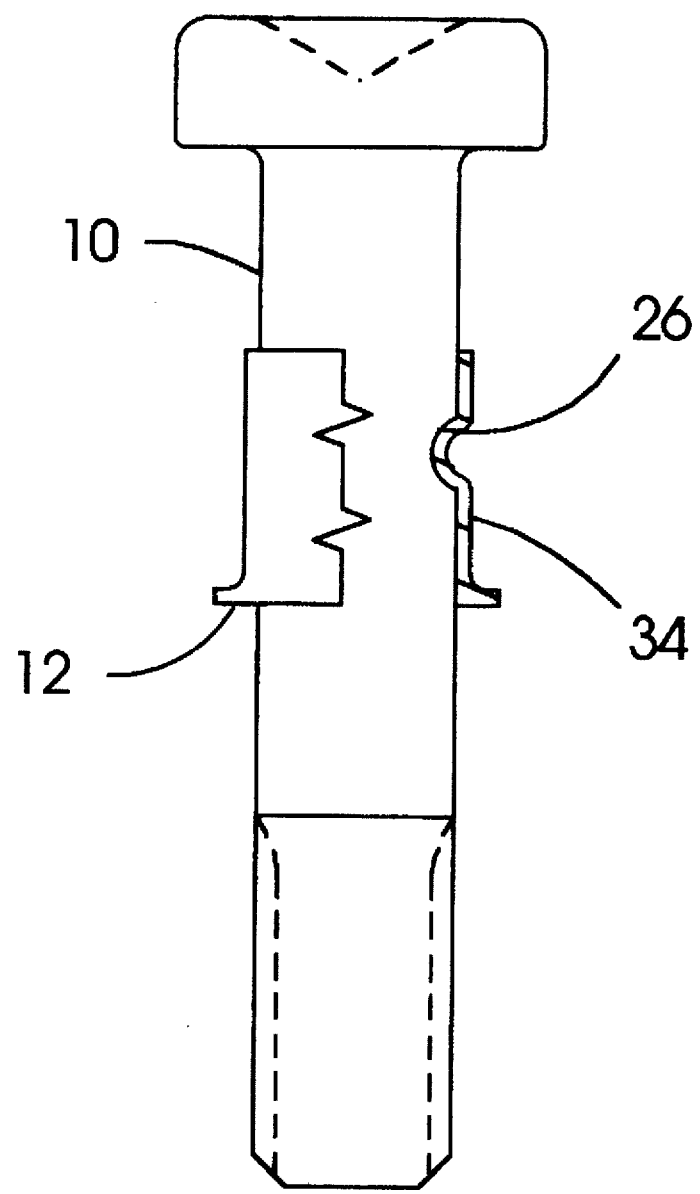
FIG. 5 shows a cross sectional view of an alternate method of attaching bolt retainer to bolt.

A retainer 12 comprises a cylindrical portion 34 and an annular flange 36. Cylindrical portion 34 of retainer 12 is welded onto smooth shank portion 30 of bolt 10. Other methods of attaching retainer 12 may include bonding with an adhesive, brazing, and swaging. FIG. 5 shows a groove 26 cut in bolt 10 and cylindrical portion 34 of retainer 12 swaged or deformed into groove 26 thereby creating a positive attachment.

A receptacle 14 comprises a generally cylindrical body 38 with an upper annular flange 40 extending inward and lower flanges 42 extending outward. Upper flange 40 acts to captivate bolt 10 between bolt head 28 and annular flange 36 of retainer 12 while still allowing unrestricted rotation of bolt 10. Cylindrical body 38 of receptacle 14 is of sufficient height and retainer 12 is located to allow bolt 10 to be unfastened from plate nut 72 with no jack out, or prying upward, of panel 60. Lower flanges 42 of receptacle 14 are areas used to attach receptacle 14 to panel 60 with small fasteners 62 such as flush head rivets.

Figure 2:
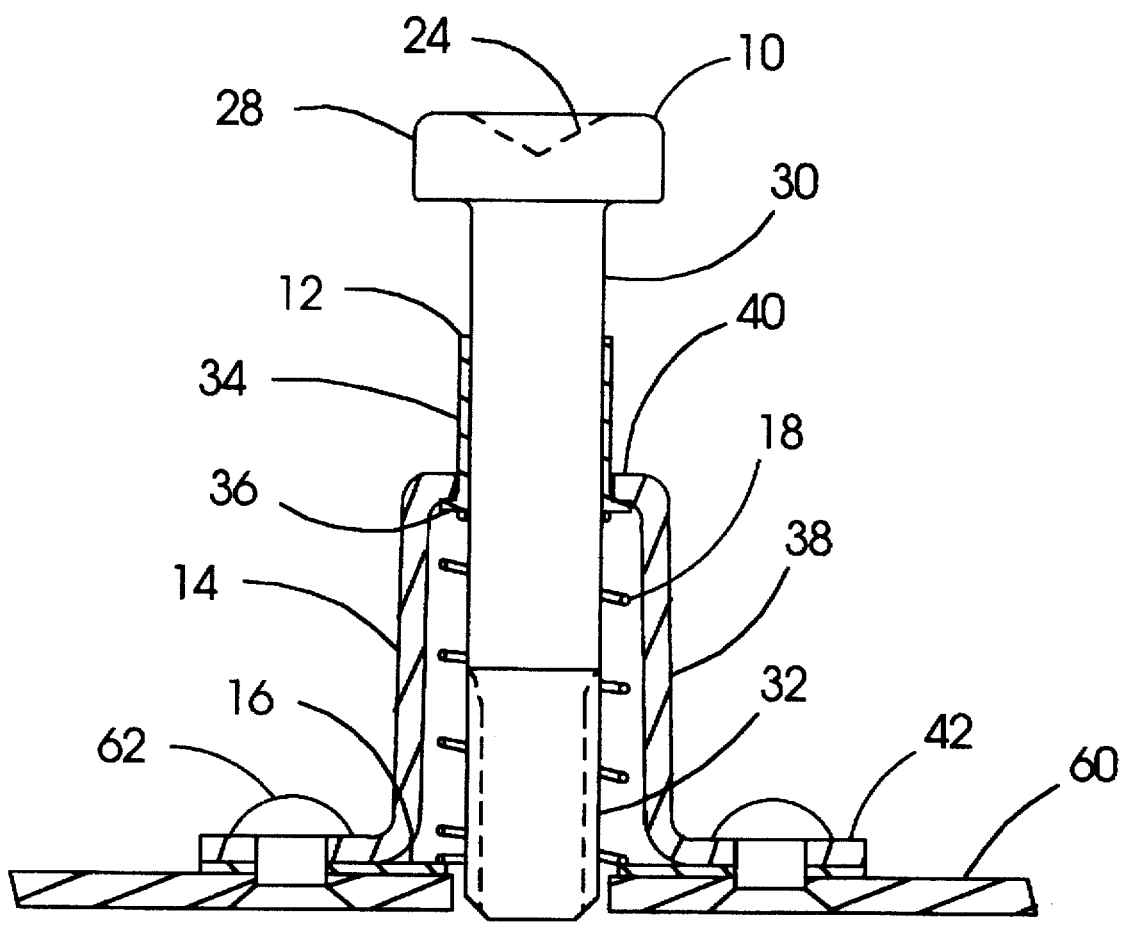

FIG. 2 illustrates the preferred embodiment of the captive bolt assembly of the present invention. Two elements have been added to the captive screw of FIG. 1.

A flat end cap 16, having the same shape as the underside of receptacle 14, is bonded to receptacle 14 with an adhesive. Other methods of attaching end cap 16 may include welding and brazing. End cap 16 contains a hole through which bolt 10 protrudes. The small fasteners 62 which attach receptacle 14 also pass through end cap 16.

A coil spring 18 is inserted between end cap 16 and annular flange 36 of retainer 12 and is contained inside receptacle 14. Spring 18 acts to hold bolt 10 in the retracted position as shown prior to fastening panel 60 onto structure.

Figure 3:
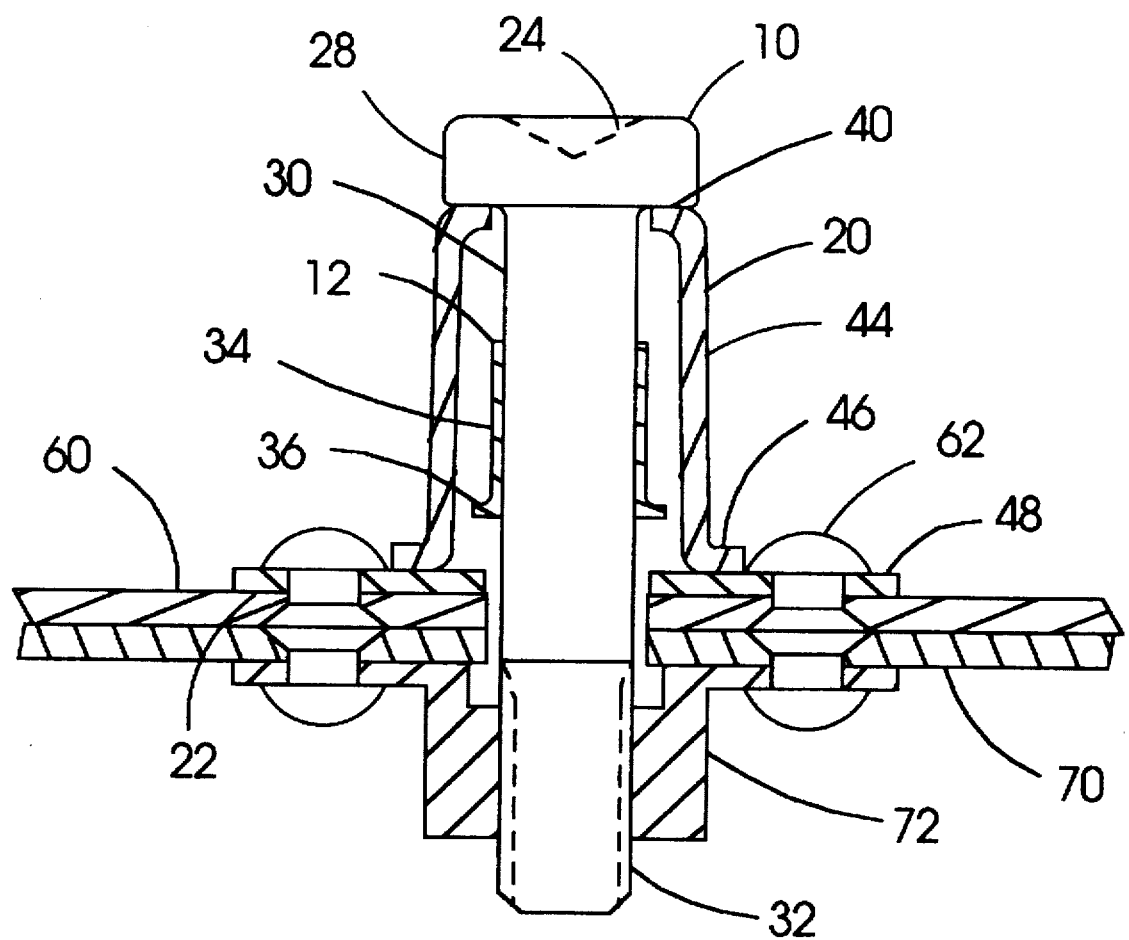
FIG. 3 shows a cross sectional view of a second embodiment of a captive bolt constructed in accordance with this invention. The captive bolt assembly is shown installed onto a panel and the joint is fully mated and clamped.

FIG. 3 illustrates another embodiment of the captive bolt assembly of the present invention. Bolt 10 and retainer 12 are the same as shown in FIG. 1.

A receptacle 20 comprises a generally cylindrical body 44 with an upper annular flange 40 extending inward and a lower annular flange 46 extending outward. Upper flange 40 acts to captivate bolt 10 between bolt head 28 and annular flange 36 of retainer 12 while still allowing unrestricted rotation of bolt 10. Cylindrical body 44 of receptacle 20 is of sufficient height and retainer 12 is located to allow bolt 10 to be unfastened from plate nut 72 with no jack out, or prying upward, of panel 60. The lower surface of receptacle 20 created by lower flange 46 is welded onto a mounting plate 22. Other means of attaching receptacle 20 to mounting plate 22 may include brazing and bonding with an adhesive.

Mounting plate 22 is flat and comprises a central hole through which bolt 10 protrudes, and lugs 48 used to attach mounting plate 22 to panel 60 with small fasteners 62 such as flush head rivets.

Figure 4:
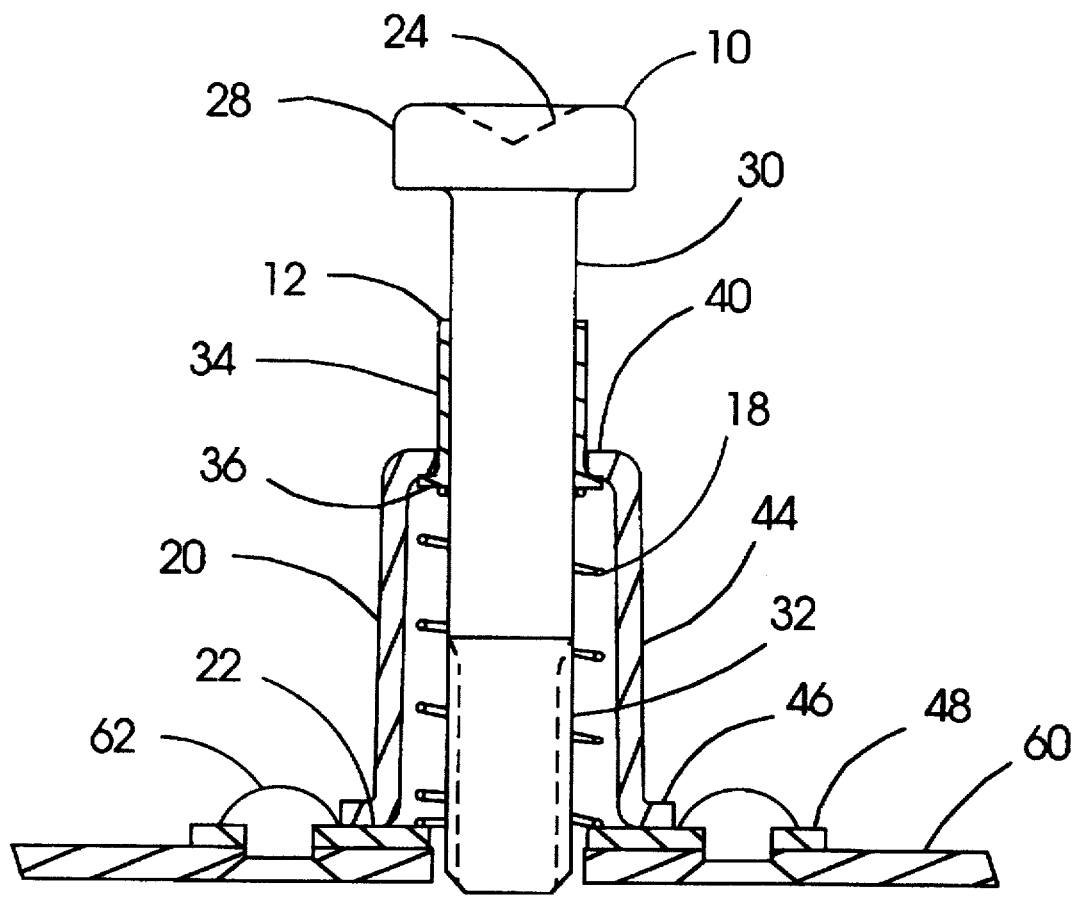
FIG. 4 shows a cross sectional view of the device of FIG. 3 with the addition of a coil spring. The captive bolt assembly is shown installed onto a panel prior to panel installation.

FIG. 4 illustrates an embodiment of the captive bolt assembly which is the same as that shown in FIG. 3 with the addition of a spring 18.

Coil spring 18 is inserted between mounting plate 22 and annular flange 36 of retainer 12 and is contained inside receptacle 20. Spring 18 acts to hold bolt 10 in the retracted position as shown prior to fastening panel 60 onto structure.

Figure 6:
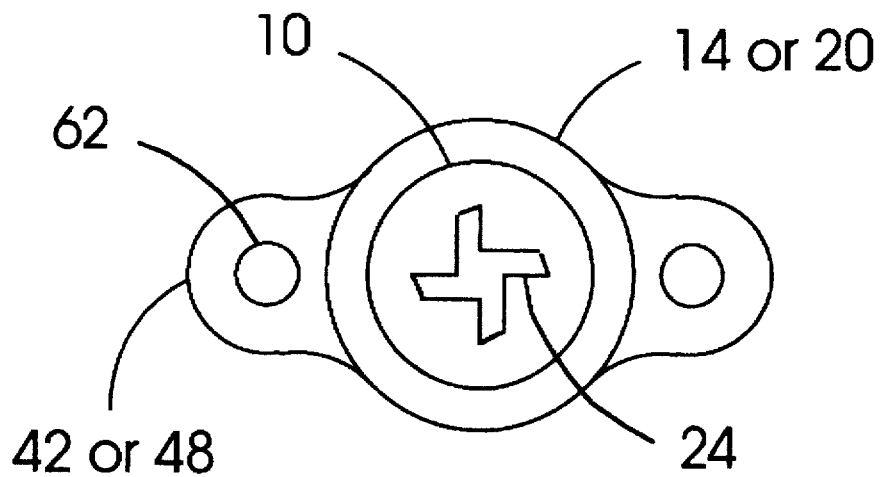
FIGS. 6 and 7 are top plan views of the captive bolt assemblies shown in FIGS. 1–4.
Figure 7:
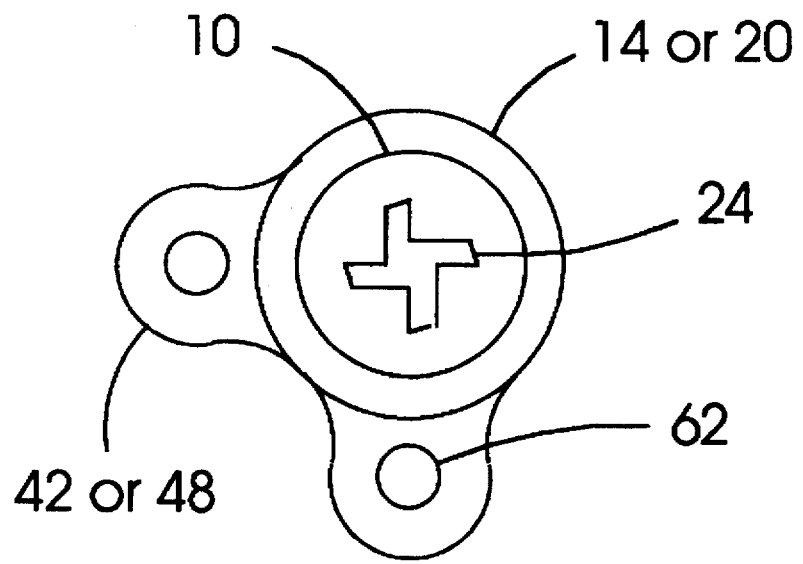

FIG. 6 illustrates the preferred pattern for the small attaching fasteners 62. Two lugs are 180 degrees apart. FIG. 7 shows an alternative right angle pattern. This pattern would be ideal if the device of FIGS. 1-4 were corner panel mounted.

FIGS. 6 and 7 show an offset cruciform screwdriver recess 24 for purposes of torquing bolt 10. Alternates may include a hexagonal head, Phillips, hexagonal, and slotted recesses.

Figure 8:
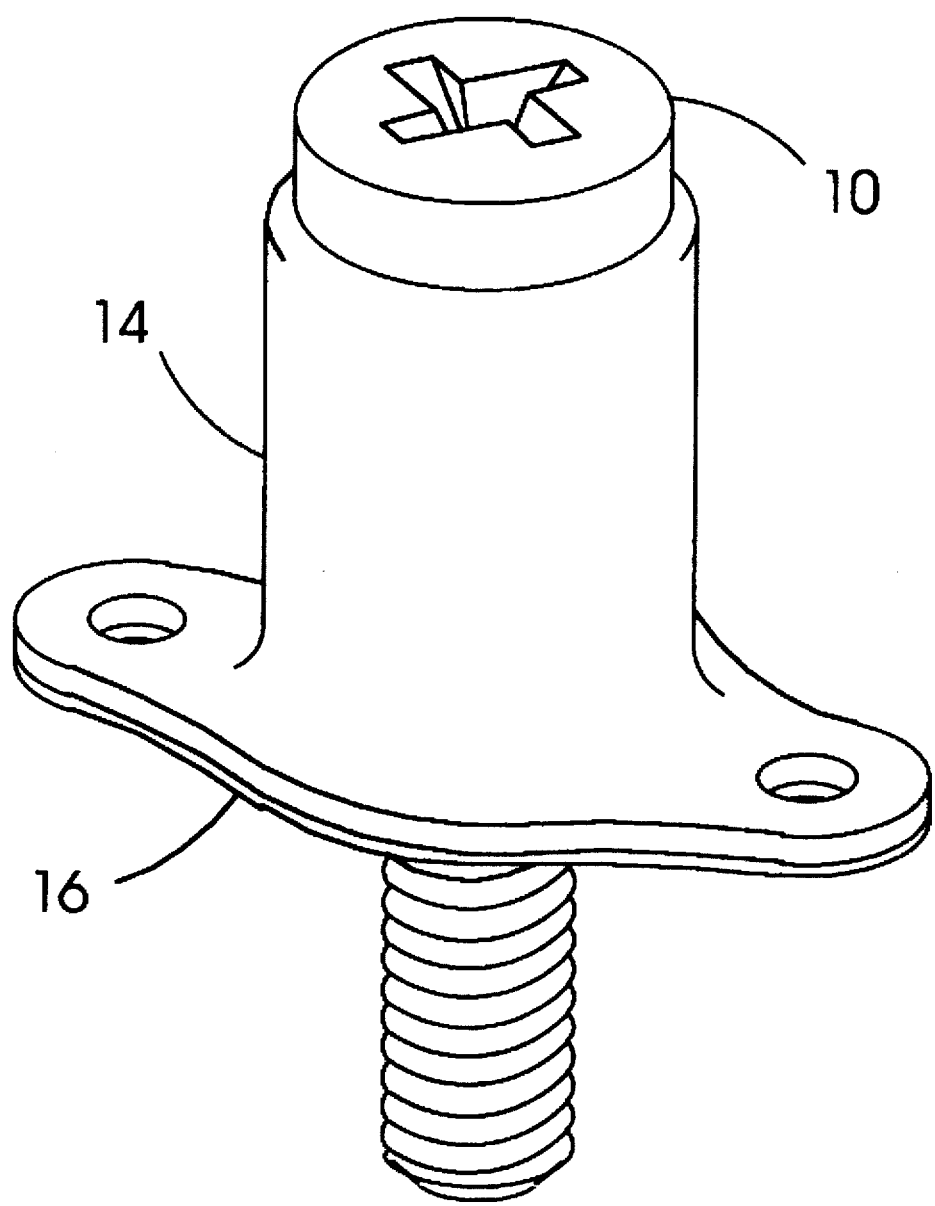
FIG. 8 is an isometric view of the captive bolt assembly shown in FIG. 2.

FIG. 8 is an isometric view of the captive bolt assembly shown in FIG. 2 and is the preferred embodiment of this invention.

CONCLUSION, RAMIFICATION, AND SCOPE

Thus the device provides a captive bolt capable of forming a high strength joint of simple and durable design.

While the present invention has been described in detail with reference to the presently preferred embodiments, it will be appreciated by those of ordinary skill in the art that various modifications can be made without departing from the invention. Accordingly, the invention is limited only by the following claims.

I claim:

1. A captive bolt assembly for attaching an upper panel to a lower panel in conjunction with an internally threaded device such as a plate nut comprising:
   a bolt comprising a threaded shank portion, a smooth shank portion, and a head containing a means to facilitate rotation of said bolt;
   a retainer, welded to said smooth shank portion of said bolt, with a flange extending outward from said bolt;
   a generally cylindrical hollow receptacle through which said bolt and said retainer slide comprising an upper flange which extends inward and acts to captivate said bolt between said bolt head and said retainer flange, and a lower flange on the opposite end of said receptacle which extends outward and is used for attachment of said captive bolt assembly; said receptacle upper flange having sufficient height and said retainer flange located such that said bolt can be fully unmated from said plate nut without said upper receptacle flange and said retainer flange coming into contact.

2. The captive bolt assembly of claim 1 whereby said captive bolt assembly is attached to said upper panel with a plurality of small fasteners through said receptacle lower flange and said upper panel.

3. The captive bolt assembly of claim 2 further comprising:
   an end cap, rigidly attached to said lower flange of said receptacle, containing a hole through which said shank of said bolt slides;
   a helical spring, mounted inside said receptacle, extending between said flange of said retainer and said end cap, causing said bolt to be in a fully retracted position when no axial load is applied to said bolt.

4. The captive bolt assembly of claim 3 wherein the method of attaching said end cap onto said lower flange of said receptacle is with an adhesive.

5. The captive bolt assembly of claim 4 wherein said means to facilitate rotation of said bolt head is a screwdriver recess.

6. The captive bolt assembly of claim 1 further comprising a mounting plate which is permanently and rigidly attached to said lower end of said receptacle; said mounting plate extending out from said receptacle through which said captive bolt assembly is affixed to said upper panel with a plurality of small fasteners and containing a hole through which said shank of said bolt slides.

7. The captive bolt assembly of claim 1 further comprising:
   a mounting plate which is welded to said lower end of said receptacle; said mounting plate extending out from said receptacle through which said captive bolt assembly is affixed to said upper panel with a plurality of small fasteners and containing a hole through which said shank of said bolt slides;
   a helical spring, mounted inside said receptacle, extending between said flange of said retainer and said mounting plate, causing said bolt to be in a fully retracted position when no axial load is applied to said bolt.

8. The captive bolt assembly of claim 7 wherein said means to facilitate rotation of said bolt head is a screwdriver recess.

9. A captive bolt assembly for attaching an upper panel to a lower panel in conjunction with an internally threaded device such as a plate nut comprising:
   a bolt comprising a threaded shank portion, a smooth shank portion, and a head containing a means to facilitate rotation of said bolt;
   a retainer, adhesively bonded to said smooth shank portion of said bolt, with a flange extending outward from said bolt;
   a generally cylindrical hollow receptacle through which said bolt and said retainer slide comprising an upper flange which extends inward and acts to captivate said bolt between said bolt head and said retainer flange, and a lower flange on the opposite end of said receptacle which extends outward and is used for attachment of said captive bolt assembly; said receptacle upper flange having sufficient height and said retainer flange located such that said bolt can be fully unmated from said plate nut without said upper receptacle flange and said retainer flange coming into contact.

10. The captive bolt assembly of claim 9 whereby said captive bolt assembly is attached to said upper panel with a plurality of small fasteners through said receptacle lower flange and said upper panel.

11. The captive bolt assembly of claim 10 further comprising:

an end cap, rigidly attached to said lower flange of said receptacle, containing a hole through which said shank of said bolt slides;

a helical spring, mounted inside said receptacle, extending between said flange of said retainer and said end cap, causing said bolt to be in a fully retracted position when no axial load is applied to said bolt.

12. The captive bolt assembly of claim 11 wherein the method of attaching said end cap onto said lower flange of said receptacle is with an adhesive.

13. The captive bolt assembly of claim 9 further comprising a mounting plate which is permanently and rigidly attached to said lower end of said receptacle; said mounting plate extending out from said receptacle through which said captive bolt assembly is affixed to said upper panel with a plurality of small fasteners and containing a hole through which said shank of said bolt slides.

14. The captive bolt assembly of claim 9 further comprising:

a mounting plate which is welded to said lower end of said receptacle; said mounting plate extending out from said receptacle through which said captive bolt assembly is affixed to said upper panel with a plurality of small fasteners and containing a hole through which said shank of said bolt slides;

a helical spring, mounted inside said receptacle, extending between said flange of said retainer and said mounting plate, causing said bolt to be in a fully retracted position when no axial load is applied to said bolt.

15. A captive bolt assembly for attaching an upper panel to a lower panel in conjunction with an internally threaded device such as a plate nut comprising:

a bolt comprising a threaded shank portion, a smooth shank portion, and a head containing a means to facilitate rotation of said bolt; said smooth shank portion modified to contain a groove;

a generally cylindrical retainer with a flange extending outward; said retainer is attached to said bolt by swaging said cylindrical portion of said retainer into said groove in said bolt smooth shank portion;

a generally cylindrical hollow receptacle through which said bolt and said retainer slide comprising an upper flange which extends inward and acts to captivate said bolt between said bolt head and said retainer flange, and a lower flange on the opposite end of said receptacle which extends outward and is used for attachment of said captive bolt assembly; said receptacle upper flange having sufficient height and said retainer flange located such that said bolt can be fully unmated from said plate nut without said upper receptacle flange and said retainer flange coming into contact.

16. The captive bolt assembly of claim 15 whereby said captive bolt assembly is attached to said upper panel with a plurality of small fasteners through said receptacle lower flange and said upper panel.

17. The captive bolt assembly of claim 16 further comprising:

an end cap, rigidly attached to said lower flange of said receptacle, containing a hole through which said shank of said bolt slides;

a helical spring, mounted inside said receptacle, extending between said flange of said retainer and said end cap, causing said bolt to be in a fully retracted position when no axial load is applied to said bolt.

18. The captive bolt assembly of claim 17 wherein the method of attaching said end cap onto said lower flange of said receptacle is with an adhesive.

19. The captive bolt assembly of claim 15 further comprising a mounting plate which is permanently and rigidly attached to said lower end of said receptacle; said mounting plate extending out from said receptacle through which said captive bolt assembly is affixed to said upper panel with a plurality of small fasteners and containing a hole through which said shank of said bolt slides.

20. The captive bolt assembly of claim 15 further comprising:

a mounting plate which is welded to said lower end of said receptacle; said mounting plate extending out from said receptacle through which said captive bolt assembly is affixed to said upper panel with a plurality of small fasteners and containing a hole through which said shank of said bolt slides;

a helical spring, mounted inside said receptacle, extending between said flange of said retainer and said mounting plate, causing said bolt to be in a fully retracted position when no axial load is applied to said bolt.

* * * * *